No. 826,857. PATENTED JULY 24, 1906.
A. L. JOHNS.
FILTER.
APPLICATION FILED AUG. 14, 1905.

WITNESSES:
John J. Kitch
E. E. Ellis

INVENTOR
Alfred L. Johns
BY Munn & Co
ATTORNEYS

UNITED STATES PATENT OFFICE.

ALFRED LEON JOHNS, OF COLORADO SPRINGS, COLORADO, ASSIGNOR OF ONE-THIRD TO WILLIAM L. EVERITT, OF DENVER, COLORADO.

FILTER.

No. 826,857.  Specification of Letters Patent.  Patented July 24, 1906.

Application filed August 14, 1905. Serial No. 274,058.

*To all whom it may concern:*

Be it known that I, ALFRED LEON JOHNS, a citizen of the United States, and a resident of Colorado Springs, in the county of El Paso and State of Colorado, have invented certain new and useful Improvements in Filters, of which the following is a full, clear, and exact description.

This invention relates to filters; and it consists substantially in the details of improvements hereinafter more particularly described, and pointed out in the claims.

The invention has reference more especially to filters employed in chlorinating processes for separating gold chlorid from ores containing the same; and one of the principal objects of the invention is to provide a filter for this purpose of an embodiment overcoming numerous disadvantages and objections frequently encountered in the use of other structures hitherto devised with like ends in view.

A further object is to provide a filter of the character referred to which is simple in construction and comparatively inexpensive to manufacture, besides being thoroughly effective and reliable in operation and possessing the capacity for service for a greater length of time than with many filters of this type as ordinarily constructed.

The above and additional objects are attained by means substantially such as are illustrated in the accompanying drawings, in which—

Figure 1:
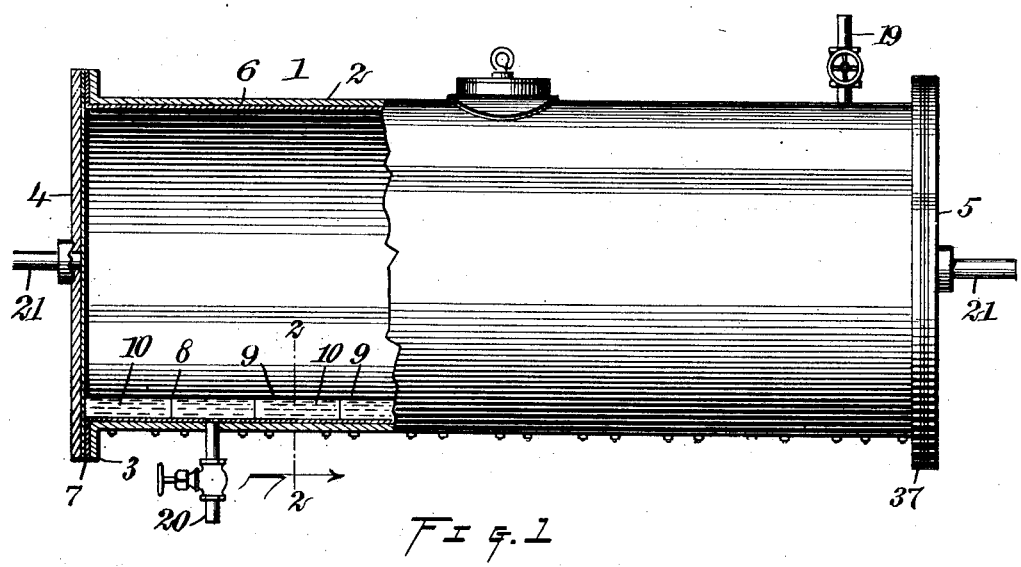
Figures 2, 3:
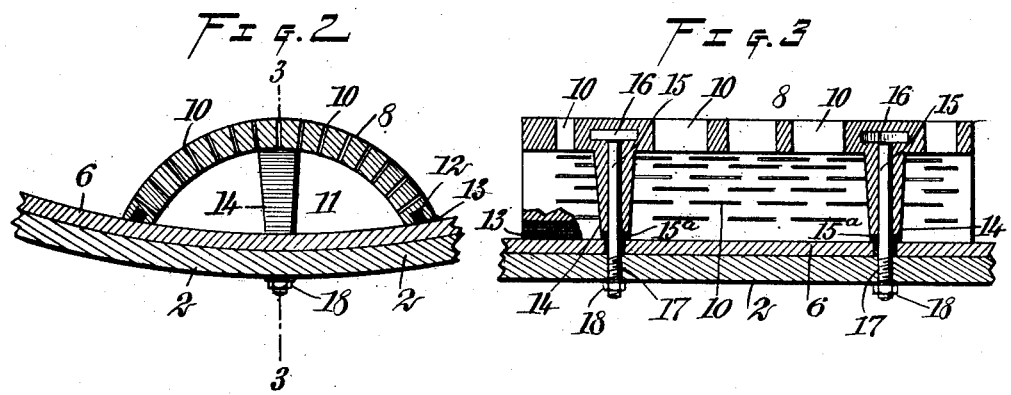
Figure 4:
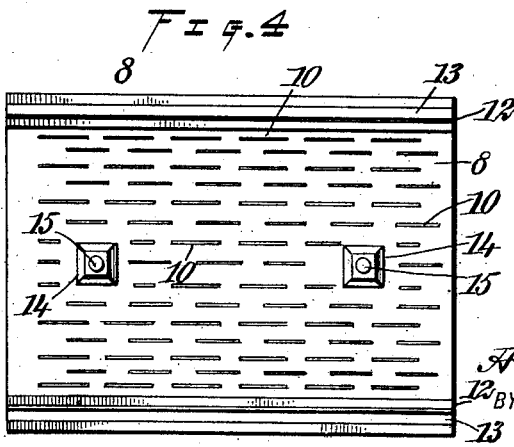

Figure 1 is a broken part-sectional side view of a filter embodying my improvements. Fig. 2 is an enlarged cross-sectional detail view on the line 2 2 of Fig. 1. Fig. 3 is a longitudinal sectional view on the line 3 3 of Fig. 2, and Fig. 4 is a bottom plan view of the filter.

Before proceeding with a more detailed description it may be stated that in the form of my improvements herein shown I employ a filter the general shape or configuration of the containing structure of which is that of a barrel or its equivalent of suitable depth or thickness, the said structure thus being capable of being conveniently rolled for a sufficient length of time to cause the ore therein to become thoroughly mixed, by which to both facilitate and expedite the chlorination of the gold contained in the ore. The filter of my improvements is of special construction, special means being provided for securing the same in the bottom of the containing structure therefor, other special means being employed between said filter and the lining of said structure to prevent access of sand and the like to a special chamber disposed beneath the filter for receiving from the latter the gold chlorid without admixture therewith of sand and slimes.

To carry out the process of chlorination, a suitable quantity of water is first placed within the containing structure for the filter, whereupon the desired quantity of gold-ore, in a very fine condition, is also placed within said structure. Suitable quantities of chlorid of lime and sulfuric acid are then placed within the structure, after which the latter is rolled for a sufficient length of time, as is well understood in filters of this general type, this action resulting in the acid and lime in the structure being converted into chlorin gas, which dissolves in the water, thus forming a strong chlorin solution, which dissolves the gold in the form of chlorid. As will be understood by those familiar with these processes the chlorination of the gold will be rendered more complete by the rolling action imparted to the structure, it being necessary, however, to separate the gold chlorid from the fine sand and mud with which it is admixed. By the use of my improvements this separation is effected both economically and completely, as will presently be explained.

In the general reference just above made to the manner in which the chlorination of the gold is effected it should have been mentioned that the interior of the structure, wherein the ore is contained, is placed under the pressure necessary to effect the washing of the chlorid from the ore.

Reference being had to the drawings by the designating characters thereon, 1 represents my improved structure in entirety, the outer shell 2 of which is of any suitable dimensions and material, but preferably constructed of steel and provided at the ends thereof with flanges 3 for the attachment thereto of the heads 4 and 5 of the said shell. The latter is circular in cross-section and of any desired interior capacity and is provided throughout with a lining 6 of lead or its equivalent, having a suitable depth or thickness and which also may be provided at each of its ends with a flange 7 to close the joint between the adjacent flange of the shell and the head of the shell coöperating therewith. Mounted in the bottom of the structure is the filter of my improvements, the same being indicated at 8 and formed substantially in the shape of an arch extending from end to end of the structure 1, as indicated in Fig. 1. The said filter is formed of lead, and inasmuch as this material is liable to be attacked or eaten into by the chlorin solution within the structure I preferably construct my improved filter of a plurality of sections 9, as indicated in Fig. 1, the said sections fitting each other closely from end to end of the said structure 1, so that in the event of any one or more parts only of the filter being attacked by the chlorin solution instead of having to remove the filter in entirety it will be necessary only to remove as many sections thereof as may have been so attacked. This is an advantage in filters of this particular type, and by so constructing the filter the expense attending the chlorinating process is considerably reduced, inasmush as the sections of the filter thus removed may be remolded into shape for use again in substantially the same way.

In order to derive the effective separation of the gold chlorids from the sand and other material with which it is admixed within the structure above the filter, I form the latter (or each of the sections thereof) with numerously-disposed longitudinal slits 10 of suitable dimensions, the same being properly spaced from each other and extending all the way through the body of the filter, (see Figs. 2 and 3,) it being here mentioned that in virtue of the special construction of the filter a chamber 11 is formed beneath the sections thereof, which extends the full length of the interior of the structure. In order that no sand or the like may find its way from the main interior of the shell 2, I provide the lower ends of the sections of the filter with longitudinally-extending grooves 12, in which are placed suitable blocks 13, of rubber or other elastic material, so that when said sections are properly disposed upon the lower portion of the lead lining 6 for the shell 2 and properly secured in rigid position the said blocks will be placed under compression, and thereby serve as a packing for thoroughly closing the joints with which they are associated. Each section 9 of the filter may be of any length desired, and near each end of each section an inner vertical post or upright 14 is provided, in each of which may be embedded a bolt 15, having at the upper end thereof a head 16 and being screw-threaded a suitable distance from its lower end, as indicated at 17, to receive thereon a nut 18 after the lower end portion of the bolt has been properly introduced through corresponding openings formed therefor in the said shell 1 and its lead lining 2. In this way each section of the filter is firmly secured in rigid position within the structure, and it is apparent that when the latter has been stopped from rolling and water-pressure applied to same an effective separation of the gold chlorid from the sand and other material will take place. It should be mentioned that the said numerously-disposed longitudinal slits 10, extending throughout the entire structure of the filter, perform a special function in the carrying out of the chlorinating process, which is thus explained. When the structure is first put on filter for the purpose of effecting the separation of the gold chlorids from the other materials, the extremely fine sand and slimes lying nearest to the filter will be caused to pass through the slits to a greater or less extent; but in a very short time the coarser sand will pack over these slits, thereby practically forming numerous filtering-bodies for the chlorids and through which the slimes are incapable of passing. In this way the greatest of advantages is derived, in that the filtering process may be carried out in a considerably shorter space of time than hitherto, with a greater yield of chlorids at less expense.

By means of the special embodiment of filter shown I am enabled to derive greater results from a structure of smaller dimension than hitherto and at considerable reduction in the expense attending the operation of the structure.
By the term "put on filter" I mean when the barrel has been stopped from rolling and water-pressure is applied at 19 of Fig. 1 and the valve 20 is opened up to allow the gold chlorid to pass off that has already passed through the filter.

It will be apparent of course that instead of constructing the filter of a plurality of sections I may construct the same of one integral body, and it will also be apparent that instead of the particular means herein employed for mounting and securing the sections of the filter in place within the lining of the shell 1 other equivalent means may be employed therefor.
The structure may be provided at any suitable portion of the upper part thereof with a suitable valve-controlled inlet-pipe 19 for the introduction of water or other material within the interior of the structure, and at the lower part of the latter a suitable distance from either end thereof a valve-controlled outlet-pipe 20 may be also employed for drawing off the contents of the structure whenever desired. The heads 4 and 5 of the structure may be provided with what may be termed "journals" 21.

To prevent the chlorin solution contained in chamber 11 from attacking the metal of the bolts 15, I provide each of the latter with a protective gasket 15ª, of suitable material, located in the vicinity of the intersection of the lower end of the corresponding post 14.

Having thus described my invention, I claim as new and desire to secure by Letters Patent—

1. A structure of the character specified, comprising a hollow body capable of being rolled, a lining therefor of suitable material, an arched filter seated upon the lining, and having numerous slits therethrough, and packing between the lining and parts of the filter immediately adjacent thereto.

2. A structure of the character specified, comprising a hollow body capable of being rolled, a lining therefor of suitable material, and an arched filter seated upon the lining, having numerous slits therethrough and formed in the parts thereof immediately adjacent to the lining with grooves having blocks of rubber therein.

3. A structure of the character specified, comprising a hollow body capable of being rolled, a lining therefor of suitable material, and an arched filter of lead seated upon the lining, having numerous slits therethrough, said filter being constructed of a plurality of sections each formed in the parts thereof immediately adjacent to the lining with grooves having packing therein.

In testimony whereof I have signed my name to this specification in the presence of two subscribing witnesses.

ALFRED LEON JOHNS.

Witnesses:
C. W. DOLPH,
C. R. HAMMOND.